(12) United States Patent
Kawasato et al.

(10) Patent No.: US 6,879,482 B2
(45) Date of Patent: Apr. 12, 2005

(54) ELECTRIC DOUBLE LAYER CAPACITOR

(75) Inventors: Takeshi Kawasato, Yokohama (JP); Kazuya Hiratsuka, Yokohama (JP); Naoki Yoshida, Yokohama (JP); Katsuji Ikeda, Yokohama (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 10/419,895

(22) Filed: Apr. 22, 2003

(65) Prior Publication Data

US 2003/0202316 A1 Oct. 30, 2003

(30) Foreign Application Priority Data

Apr. 22, 2002 (JP) ......................................... 2002-119059

(51) Int. Cl.[7] .............................. H01G 9/00; H01G 9/02; H01M 6/04
(52) U.S. Cl. ....................... 361/502; 361/504; 252/62.2
(58) Field of Search ................................ 361/502–512; 252/62.2

(56) References Cited

U.S. PATENT DOCUMENTS 5,969,936 A    10/1999    Kawasato et al.

FOREIGN PATENT DOCUMENTS

| | | |
|---|---|---|
| JP | 49-68254 | 7/1974 |
| JP | 62-237715 | 10/1987 |
| JP | 3-203311 | 9/1991 |
| JP | 4-154106 | 5/1992 |
| JP | 4-286108 | 10/1992 |
| JP | 2000-252171 | 9/2000 |
| JP | 2001143750 A * | 5/2001 .......... H01M/10/40 |
| WO | WO 01/03229 A1 * | 1/2001 .......... H01M/10/40 |

OTHER PUBLICATIONS

U.S. Appl. No. 10/315,169, filed Dec. 10, 2002, Kawasato et al.

* cited by examiner

Primary Examiner—Eric Thomas
(74) Attorney, Agent, or Firm—Oblon, Spivak, McClelland, Maier & Neustadt, P.C.

(57) ABSTRACT

An electric double layer capacitor having a pair of polarized electrodes and an electrolytic solution capable of forming an electric double layer at the interface with the polarized electrodes, wherein the electrolytic solution is an organic electrolytic solution containing a fluorobenzene of the formula 1:

Formula 1

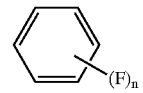

wherein n is an integer of from 1 to 6.

19 Claims, No Drawings

ELECTRIC DOUBLE LAYER CAPACITOR

BACKGROUND OF THE INVENTION (1) Field of the Invention

The present invention relates to an electric double layer capacitor, particularly to an electric double layer capacitor having high voltage retention and excellent reliability.

As a shape of a conventional electric double layer capacitor, there may be a coin type wherein an element having a separator sandwiched between a pair of polarized electrodes composed mainly of activated carbon formed on current collectors, is accommodated together with an electrolytic solution in a metal casing, which is then sealed by a metal cover via a gasket, or a cylindrical type wherein an element having a pair of polarized sheet electrodes wound with a separator interposed therebetween, is accommodated together with an electrolytic solution in a metal casing, which is then sealed so that the electrolytic solution will not evaporate from an opening of the casing.

Further, as one for a large current and large capacitance, a lamination type electric double layer capacitor has also been proposed wherein an element having many polarized sheet electrodes laminated via a separator disposed therebetween, is incorporated (JP-A-4-154106, JP-A-3-203311, JP-A-4-286108). Namely, rectangular polarized sheet electrodes are used as a positive electrode and a negative electrode, and they are alternately laminated with a separator interposed therebetween, to form an element, which is then accommodated in a casing in such a state that a positive electrode lead member and a negative electrode lead member are connected by caulking to the terminals of the positive and negative electrodes, respectively, then the element is impregnated with an electrolytic solution, and the casing is closed with a cover.

(2) Description of Related Art

As an electrolytic solution for a conventional electric double layer capacitor, not only an aqueous electrolytic solution containing a mineral acid such as sulfuric acid, an alkali metal salt or an alkali, but also various organic electrolytic solutions have been used. As the solvent for such organic electrolytic solutions, propylene carbonate, γ-butyrolactone, acetonitrile, dimethyl formamide (JP-A-49-068254) or a sulfolane derivative (JP-A-62-237715), has been known. When the withstand voltages are compared, the aqueous electrolytic solution has a withstand voltage of 0.8 V, while the organic electrolytic solution has a withstand voltage of from 2.5 to 3.3 V. The electrostatic energy of a capacitor corresponds to the square of the withstand voltage. Accordingly, from the viewpoint of the electrostatic energy, the organic electrolytic solution is more advantageous.

The withstand voltage of an electric double layer capacitor is basically restricted by the electrochemical decomposition voltage of the electrolytic solution. In a case where an organic electrolytic solution which has a high withstand voltage as compared with an aqueous electrolytic solution, is used as an electrolytic solution, it is used by an application of a voltage higher than the decomposition voltage of water, whereby electrolysis takes place due to an impurity, particularly water, contained in the electrolytic solution. Accordingly, it is common to use an organic electrolytic solution as dehydrated and having both the solvent and electrolyte highly purified.

On the other hand, for the electrodes for an electric double layer capacitor, an electrode material having a high specific surface area, is used, but when it is combined with the above organic electrolytic solution, it is common to use activated carbon as the electrode material. Activated carbon is a porous material having fine pores of a few nm, but has high adsorbing ability and thus is likely to adsorb moisture in an environment. Accordingly, activated carbon is required to be highly dehydrated in the process for producing an electric double layer capacitor. It is usually required to carry out dehydration treatment at a high temperature of at least 300° C. in vacuum or in an inert gas atmosphere in order to completely remove moisture from fine pores of activated carbon. However, activated carbon particles are usually formed on a current collector by means of a binder such as an organic polymer to constitute an electrode, and the binder undergoes thermal decomposition by treatment at a high temperature of at least 300° C. Accordingly, heat treatment is usually carried out at a temperature of at most 200° C., whereby it is difficult to completely remove moisture in the activated carbon electrodes.

Further, there has been a problem that due to the presence of a portion where the activated carbon surface and the electrolytic solution are not in contact with each other, i.e. the activated carbon surface is not wetted by the electrolytic solution due to inadequate impregnation of the electrolytic solution, or a portion where a gas generated by electrolysis is retained within fine pores of activated carbon, the area to store electric charge tends to be small, the capacitance developing ratio tends to decrease, and the resistance tends to increase.

An electric double layer capacitor employing an organic electrolytic solution, is operated at a voltage of at least 2 V which is higher than the theoretical decomposition voltage (1.23 V) of water for the purpose of increasing the energy density. Accordingly, in a state where the voltage is applied after assembling a capacitor cell, water remaining in the above-mentioned fine pores will be electrolyzed to generate a gas. It has been found that the generated gas will be gradually accumulated in the fine pores of activated carbon and will remain in the interior of the element without being discharged out of the element formed by impregnating the electrolytic solution to a pair of electrodes facing each other via a separator. If the electric double layer capacitor is used for a long period of time in such a state, the electrolytic solution present in the pores of activated carbon is likely to be driven out by the generated gas, whereby the capacitance normally expected to be obtainable, tends to be hardly obtainable, and further, an electroconductive path created by movement of ions in the pores, is likely to be blocked off. Consequently, there will be a decrease in the capacitance of the electric double layer capacitor or a deterioration in performance such as an increase of the internal resistance. Further, water remaining in the pores can not completely be removed, electrolysis due to adsorbed electric charge will take place continuously. Accordingly, there has been a problem that the voltage retention is poor after applying a voltage and opening the circuit.

BRIEF SUMMARY OF THE INVENTION

Under the circumstances, it is an object of the present invention to solve the above-mentioned problems of the prior art and to provide an electric double layer capacitor having high voltage retention and excellent reliability, and an organic electrolytic solution for such a purpose.

The present invention provides an electric double layer capacitor having a pair of polarized electrodes and an electrolytic solution capable of forming an electric double layer at the interface with the polarized electrodes, wherein the electrolytic solution is an organic electrolytic solution containing a fluorobenzene of the formula 1:

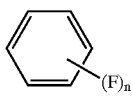

Formula 1 wherein n is an integer of from 1 to 6.

Further, the present invention provides an organic electrolytic solution comprising a fluorobenzene of the formula 1:

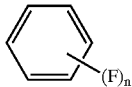

Formula 1 wherein n is an integer of from 1 to 6, and an electrolyte having at least one cation selected from the group consisting of the formula 2:

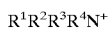 $\quad$ Formula 2 wherein each of $R^1$, $R^2$, $R^3$ and $R^4$ which are independent of one another, is a methyl group, an ethyl group or a n-propyl group, provided that two selected from $R^1$ to $R^4$ may together form a tetramethylene group, the formula 3:

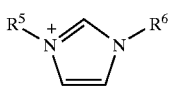

Formula 3 wherein each of $R^5$ and $R^6$ which are independent of each other, is a $C_{1-3}$ alkyl group, and the formula 4:

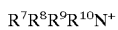 $\quad$ Formula 4 wherein $R^7$ is a methoxyalkyl group of the formula —(CH$_2$)$_n$OCH$_3$, wherein n is an integer of from 1 to 3, and each of $R^8$, $R^9$ and $R^{10}$ which are independent of one another, is a methyl group or an ethyl group, provided that two selected from $R^8$ to $R^{10}$ may together form a tetramethylene group.

DETAILED DESCRIPTION OF THE INVENTION

Now, the present invention will be described in detail with reference to the preferred embodiments.

In the present invention, the fluorobenzene is preferably one having a large dielectric constant. Preferred is at least one member selected from the group consisting of a monofluorobenzene, a difluorobenzene and a trifluorobenzene. As the structure of the difluorobenzene, o-difluorobenzene or m-difluorobenzene is preferred. Likewise, as the structure of the trifluorobenzene, 1,2,3-trifluorobenzene or 1,2,4-trifluorobenzene is preferred.

In the present invention, the amount of fluorobenzene in the electrolytic solution is suitably adjusted depending upon the pore characteristics or the amount of water remaining in the carbon material contained in the electrodes. However, the fluorobenzene is preferably maintained in a state where it is completely dissolved in the organic electrolytic solution. Further, when the fluorobenzene is added, the dielectric constant of the organic electrolytic solution decreases, and accordingly, the amount of the fluorobenzene is preferably controlled to be within a range where decrease of the ion conductivity due to a decrease in the dielectric constant of the organic electrolytic solution, is small. Thus, the fluorobenzene is contained preferably in an amount of from 0.1 to 30%, particularly from 1 to 20%, in the total mass of the electrolytic solution.

The operational principle in the present invention is not clearly understood, but it is considered that the fluorobenzene contained in the electrolytic solution has a high affinity to the pseudographite surface present on the inner wall of pores of the carbon material and can easily be substituted and adsorbed for the water remaining in the fine pores without being removed by the heat treatment. When a voltage is applied to an element having an electrolytic solution impregnated, such water will readily be electrolyzed and gasified. Accumulation of electric charge due to formation of an electric double layer, takes place mainly in the pores. Accordingly, with a conventional electric double layer capacitor containing no fluorobenzene in the electrolytic solution, if a voltage is applied to the element having the electrolytic solution impregnated, a gas generated by electrolysis of water remaining in the fine pores, will remain in the fine pores, whereby the performance used to be deteriorated. Whereas, in the present invention, it is considered that the gas generated by the electrolysis of remaining water by an application of a voltage will be present not in fine pores as described above, but outside the fine pores i.e. in spaces among particles or in micropores in the activated carbon particles, or will be discharged as bubbles out of the element. Accordingly, it is considered that deterioration in performance of the electric double layer capacitor can be suppressed to a minimum level.

Such an effect is observed also in a case where benzene or its chlorinated derivative is added to the electrolytic solution and is disclosed in JP-A-2000-252171. Although the operation principle is not clearly understood, by the presence of a compound having a benzene ring, the affinity of the electrolytic solution to the activated carbon surface is improved, and further due to a strong electron attracting property of a fluoro group, the solvent containing a fluorobenzene will by itself show a high dielectric constant. It is accordingly considered that the fluorobenzene shows a higher compatibility to an organic solvent of the organic electrolytic solution and a higher effect than benzene or its chlorinated derivative.

As described above, when a voltage is applied to the above element, a decomposed gas will be generated, and this gas will increase the internal pressure of the electric double layer capacitor cell. Accordingly, the application of a voltage in the production process is preferably carried out in an open state in a dried atmosphere, and the generated gas is discharged out of the capacitor cell. Here, "an open state" means a state where the element is not accommodated in the cell, or a state where even if it is accommodated in the cell, the cell is not closed. Here, the dried atmosphere is preferably one having a dewpoint of at most −20° C., more preferably at most −30° C., still more preferably at most −40° C.

Further, the voltage to be applied to the element, is preferably at least 2 V which is higher than the decomposition voltage of water, more preferably at least 2.5 V. The temperature at which the voltage is applied to the element, is preferably from 15 to 85° C., more preferably from 20 to 70° C. If the voltage is applied under heating, the effect to increase the durability of the electric double layer capacitor will be large, and the voltage application time can be shortened. However, if the temperature is too high, the initial capacitance tends to decrease, and the internal resistance tends to increase.

The electrolyte to be used for the electrolytic solution for the electric double layer capacitor of the present invention is particularly preferably one having at least one cation selected from the group consisting of a quaternary onium cation of the formula 2:

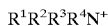  Formula 2 wherein each of $R^1$, $R^2$, $R^3$ and $R^4$ which are independent of one another, is a methyl group, an ethyl group or a n-propyl group, provided that two selected from $R^1$ to $R^4$ may together form a tetramethylene group, an imidazolium cation of the formula 3:

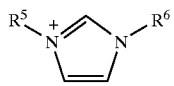  Formula 3 wherein each of $R^5$ and $R^6$ which are independent of each other, is a $C_{1-3}$ alkyl group, and a quaternary onium cation of the formula 4:

  Formula 4 wherein $R^7$ is a methoxyalkyl group of the formula $-(CH_2)_nOCH_3$, wherein n is an integer of from 1 to 3, and each of $R^8$, $R^9$ and $R^{10}$ which are independent of one another, is a methyl group or an ethyl group, provided that two selected from $R^8$ to $R^{10}$ may together form a tetramethylene group.

Further, the anion is preferably an anion selected from the group consisting of $BF_4^-$, $PF_6^-$, $CF_3SO_3^-$ and $(CF_3SO_2)_2N^-$. Particularly, $BF_4^-$ is more preferred from the viewpoint of the electrical conductivity and the electrochemical stability.

The concentration of the above electrolyte in the electrolytic solution is preferably at least 0.5 mol/kg, particularly preferably at least 1.0 mol/kg, for the purpose of securing the amount of ions required for formation of an electric double layer and obtaining adequate electroconductivity.

As the organic solvent to be used in the present invention, a known solvent may be used. For example, a solution is preferred which contains, as a solvent, at least one organic solvent, such as, a cyclic carbonate such as propylene carbonate, ethylene carbonate or butylene carbonate, a chain carbonate such as dimethyl carbonate, ethylmethyl carbonate or diethyl carbonate, a cyclic lactone such as γ-butyrolactone or γ-valerolactone, a nitrile such as acetonitrile or glutaronitrile, a sulfolane derivative such as sulfolane or 3-methylsulfolane, dimethylformamide, 1,2-dimethoxyethane, nitromethane, or trimethylphosphate. It is particularly preferably at least one member selected from the group consisting of propylene carbonate, butylene carbonate, sulfolane, dimethyl carbonate and methylethyl carbonate.

The organic electrolytic solution comprising the above electrolyte, the solvent and the fluorobenzene, preferably contains metal impurities and water as little as possible. Usually, one having a water content of at most 10 ppm, is preferably employed.

In the present invention, it is preferred to employ an organic electrolytic solution wherein an electrolyte of the formula 5 or 6:

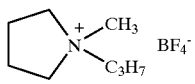  Formula 5

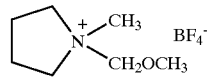  Formula 6 is contained in an amount of from 30 to 60%, monofluorobenzene is contained in an amount of from 0.1 to 30%, and dimethyl carbonate is contained in an amount of from 20 to 69%, in the total mass of the electrolytic solution, whereby a high electroconductivity is obtainable at a level of from 13 to 18 mS/cm with the electrolyte of the formula 5 or from 15 to 20 mS/cm with the electrolyte of the formula 6, the reliability is excellent even when a high voltage at a level of 3.0 V is applied, and the increase in resistance can be suppressed. Further, it is more preferred to employ an organic electrolytic solution wherein ethylmethyl carbonate is contained in an amount of from 0.1 to 30% in the total mass of the electrolyte, whereby the low temperature characteristics can be improved.

Further, it is preferred to employ an organic electrolytic solution wherein an electrolyte of the formula 7:

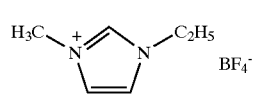  Formula 7 is contained in an amount of from 15 to 60%, monofluorobenzene is contained in an amount of from 0.1 to 30%, and propylene carbonate is contained in an amount of from 10 to 85%, in the total mass of the electrolytic solution, whereby a high electroconductivity of from 15 to 23 mS/cm can be obtained, and a high output discharge can be carried out.

The polarized electrodes to be used for the electric double layer capacitor of the present invention may be ones made mainly of an electrochemically inactive material having a high specific surface area, specifically those made mainly of activated carbon, fine metal particles or fine electrically conductive oxide particles. Among them, it is preferred to use those having an electrode layer comprising a powder of carbon material having a high specific surface area such as activated carbon, formed on the surface of metal current collectors.

Specifically, the electrode layer is formed preferably by using, as the main component, a powder of carbon material such as activated carbon or polyacene having a large specific surface area (specific surface area: about 200 to 3,000 m²/g), adding thereto carbon black, acetylene black, Ketjenblack or carbon whisker as a conductive material, and polytetrafluoroethylene (PTFE), polyvinylidene fluoride (PVdF) or carboxymethylcellulose as a binder, kneading the mixture in the presence of a liquid lubricant such as an alcohol, molding the mixture into a sheet by rolling, followed by drying to obtain a sheet-form molded product, which is bonded by heat pressing or bonded by means of an electrically conductive adhesive or the like to both sides of a metal current collector.

Further, instead of kneading, a solvent capable of dissolving the above binder or a solvent mixture containing such a solvent (water, N-methylpyrrolidone, etc.) may be mixed with activated carbon, a conductive agent and a binder to obtain a slurry, which may be coated on both sides of a metal current collector and dried to form the electrode layer. The thickness of such an electrode layer is not particularly limited, but is usually from about 10 μm to 0.5 mm.

As the activated carbon material, one derived from a natural plant tissue such as coconut shell, a synthetic resin such as a phenolic resin or a fossil fuel such s coal, coke or pitch, may be employed. As an activating method for activated carbon, steam activation or alkali activation (particularly activation by KOH) may be applied, although it may vary depending upon the raw material to be employed. Activated carbon derived from a natural plant tissue or a fossil fuel, contains a relatively large amount of metal impurities, and accordingly, washing with e.g. an acid is usually required. Similarly, activated carbon obtained by alkali activation contains a large amount of an alkali metal used for the activation or metal impurities brought from an activation apparatus due to the reaction with the alkali, and accordingly a washing operation will be required. Among them, steam activated carbon made of a synthetic resin as a raw material, is most preferred from the viewpoint of metal impurities.

The element construction of the electric double layer capacitor of the present invention is not particularly limited, and the present invention can be applied to any one of a coin type structure, a cylindrical structure or an angular structure. For example, the coin type structure may be formed in such a manner that an element is formed by disposing a separator between a pair of electrodes having electrode layers composed mainly of activated carbon provided on current collectors, and the element is, together with an electrolytic solution, sealed in a coin type metal casing by a metal cover and a gasket which insulates both.

Whereas, the cylindrical structure may be formed in such a manner that a pair of strip-shaped electrodes, specifically a strip-shaped positive electrode having an electrode layer composed mainly of e.g. activated carbon formed on both sides of a metal current collector and a strip-shaped negative electrode having an electrode layer of the same construction formed on both sides of a metal current collector, are alternately laminated via a strip-shaped separator and wound to obtain a wound element, which is then accommodated in a cylindrical metal casing and impregnated with the electrolytic solution, whereupon the current collecting leads taken out from the positive electrode and the negative electrode, respectively, are connected, respectively, to the electrode terminals provided, for example, on an electrically insulating sealing cover, and the sealing cover is fit to the metal casing.

The angular structure may be formed in such a manner that electrode layers are formed on both sides of a rectangular metal current collector, a plurality of positive electrodes and a plurality of negative electrodes, each provided with a current collecting lead, are alternately laminated via a separator, to form a laminated element having current collecting leads taken out, which is accommodated in an angular metal casing and impregnated with the electrolytic solution, whereupon a sealing cover is fit on the angular casing.

The current collector may be made of any metal so long as it is electrochemically or chemically corrosion resistant. In the case of a coin type structure, the housing member such as the metal sealing cover or the metal casing, may serve as a current collector, in many cases. As the current collector in the case of the cylindrical structure or the angular structure, it is preferred to employ a surface-roughened foil or net made of a metal such as aluminum, stainless steel, nickel or tantalum, particularly a foil or net made of a stainless steel, aluminum or an alloy containing it. More preferred is an aluminum foil having a purity of 99.9%, particularly preferably 99.99%. In the present invention, it is preferred to employ a metal current collector made of such a metal foil and having a thickness of from 10 μm to 0.5 mm.

In the case of a cylindrical structure or an angular structure, current collecting leads will be provided to the metal current collectors. It is preferred to provide a tape- or ribbon-shaped portion on a current collector having no electrode layer formed thereon and to bond an electrically conductive tab terminal, wire, tape, ribbon or the like by e.g. welding to such a portion to form a current collecting lead. Otherwise, a portion having no electrode layer formed, is provided at a part of a current collector, so that such a portion may be used as a current collecting lead. Specifically, for example, in the case of a cylindrical structure, a strip portion having no electrode layer formed, may be provided along one end in the longitudinal direction of a strip current collector, and the counter electrode is overlaid via a separator so that the strip portion is located at the opposite end, and the assembly is wound to obtain an element, whereby both end surfaces (the above strip portions) of the element can be used as current collecting leads.

The separator of the present invention is not particularly limited, so long as it is a porous separator so that ions can permeate therethrough. A fine porous polyethylene film, a fine porous polypropylene film, a polyethylene non-woven fabric, a polypropylene non-woven fabric, a glass fiber incorporated non-woven fabric, a glass mat, cellulose paper, sisal hemp or Manila hemp, may, for example, be preferably employed. The thickness of the separator is preferably from 20 to 200 μm, particularly preferably from 30 to 100 μm. From the viewpoint of the absorptivity for the electrolytic solution, the liquid maintaining property and the internal resistance, the higher the porosity, the better. However, as the porosity is high, defects such as pinholes are likely to increase, thus leading to self discharge failure. Accordingly, the porosity is usually preferably within a range of from 50 to 90%, more preferably within a range of from 60 to 85%.

Now, the present invention will be described in further detail with reference to Examples and Comparative Examples. However, it should be understood that the present invention is by no means restricted by such specific Examples.

EXAMPLE 1 (PRESENT INVENTION)

Ethanol was added to a mixture comprising a phenol resin type activated carbon having a specific surface area of 2,000 m$^2$/g activated by steam, PTFE and carbon black in a mass ratio of 8:1:1, followed by kneading. This was formed into a sheet shape and then rolled in a thickness of 0.6 mm to obtain an electrode sheet, which was punched into disks having a diameter of 12 mm.

Such disk-shaped electrodes were bonded to the positive electrode side and negative electrode side insides, respectively, of a stainless steel casing serving as a current collector and housing member for a coin-shaped cell by means of a graphite type conductive adhesive. Then, the entire assembly including the stainless steel casing was subjected to heat treatment under reduced pressure to remove moisture, etc. The electrodes were impregnated with an electrolytic solution having 1.5 mol/kg of $(C_2H_5)_3(CH_3)N^+BF_4^-$ dissolved in a solvent mixture comprising propylene carbonate and monofluorobenzene in a mass ratio of 95:5. A separator (thickness: 160 μm, porosity: 70%) of a non-woven fabric made of polypropylene fiber was sandwiched between the two electrodes, and the stainless steel casing was caulked by a gasket as an insulator and sealed, to obtain a coin-shaped electric double layer capacitor having a diameter of 18.4 mm and a thickness of 2.0 mm.

EXAMPLE 2 (PRESENT INVENTION)

A coin-shaped electric double layer capacitor was obtained in the same manner as in Example 1 except that as the electrolytic solution, a solution having 1.5 mol/kg of $(C_2H_5)_3(CH_3)N^+BF_4^-$ dissolved in a solvent mixture comprising propylene carbonate and 1,2-difluorobenzene in a mass ratio of 96:4, was used.

EXAMPLE 3 (PRESENT INVENTION)

Ethanol was added to a mixture comprising a phenol resin type activated carbon having a specific surface area of 2,000 m$^2$/g, activated by molten KOH, PTFE and carbon black in a mass ratio of 8:1:1, followed by kneading and forming into a sheet shape, and then by rolling in a thickness of 0.1 mm to obtain a strip electrode sheet. The obtained electrode sheet was bonded by an electrically conductive adhesive to an aluminum foil having the surface etched. Then, moisture, etc. were removed by heat treatment under reduced pressure, and a glass fiber separator (thickness: 100 μm, porosity: 80%) was sandwiched between the positive and negative electrodes and wound up on a winding core having a diameter of 2 mm to obtain a cylindrical element having a diameter of 7 mm and a height of 20 mm. This element was impregnated with an electrolytic solution having 1.2 mol/kg of $(C_2H_5)_4N^+BF_4^-$ dissolved in a solvent mixture comprising acetonitrile and 1,2,3-trifluorobenzene in a mass ratio of 97:3, and butyl rubber was inserted and sealing was carried out by a caulking tool to obtain a cylindrical electric double layer capacitor.

EXAMPLE 4 (PRESENT INVENTION)

Ethanol was added to a mixture comprising activated carbon having a specific surface area of 2,000 m$^2$/g, obtained by calcining a resol resin in a nitrogen atmosphere at 650° C. and activated with molten KOH, PTFE and carbon black in a mass ratio of 8:1:1, followed by kneading and forming into a sheet shape, and then by rolling in a thickness of 0.6 mm to obtain an electrode sheet, which was punched into disks having a diameter of 12 mm.

A coin-shaped electric double layer capacitor having a diameter of 18.4 mm and a thickness of 2.0 mm was obtained in the same manner as in Example 1 except that such disk-shaped electrodes were used as positive and negative electrodes, and as the electrolytic solution, a solution having 1.5 mol/kg of $(C_2H_5)_3(CH_3)N^+BF_4^-$ dissolved in a solvent mixture comprising sulfolane, ethylmethyl carbonate and monofluorobenzene in a mass ratio of 85:15:5, was used.

EXAMPLE 5 (PRESENT INVENTION)

A coin-shaped electric double layer capacitor having a diameter of 18.4 mm and a thickness of 2.0 mm was obtained in the same manner as in Example 1 except that as the electrolytic solution, a solution having 2.2 mol/kg of the salt of the above formula 5 dissolved in a solvent mixture comprising dimethyl carbonate and monofluorobenzene in a mass ratio of 60:40, was used.

EXAMPLE 6 (PRESENT INVENTION)

A coin-shaped electric double layer capacitor having a diameter of 18.4 mm and a thickness of 2.0 mm, was obtained in the same manner as in Example 1, except that as the electrolytic solution, a solution having 2.2 mol/kg of the salt of the above formula 5 dissolved in a solvent mixture comprising dimethyl carbonate, ethylmethyl carbonate and monofluorobenzene in a mass ratio of 60:10:30, was used.

EXAMPLE 7 (PRESENT INVENTION)

A coin-shaped electric double layer capacitor having a diameter of 18.4 mm and a thickness of 2.0 mm, was obtained in the same manner as in Example 1, except that as the electrolytic solution, a solution having 2.4 mol/kg of the salt of the above formula 6 dissolved in a solvent mixture comprising dimethyl carbonate and monofluorobenzene in a mass ratio of 60:40, was used.

EXAMPLE 8 (PRESENT INVENTION)

A coin-shaped electric double layer capacitor having a diameter of 18.4 mm and a thickness of 2.0 mm, was obtained in the same manner as in Example 1, except that as the electrolytic solution, a solution having 2.4 mol/kg of the salt of the above formula 6 dissolved in a solvent mixture comprising dimethyl carbonate, ethylmethyl carbonate and monofluorobenzene in a mass ratio of 60:10:30, was used.

EXAMPLE 9 (PRESENT INVENTION)

A coin-shaped electric double layer capacitor having a diameter of 18.4 mm and a thickness of 2.0 mm, was obtained in the same manner as in Example 1, except that as the electrolytic solution, a solution having 2.5 mol/kg of the salt of the above formula 7 dissolved in a solvent mixture comprising propylene carbonate and monofluorobenzene in a mass ratio of 80:20, was used.

EXAMPLE 10 (COMPARATIVE EXAMPLE)

A coin-shaped electric double layer capacitor was obtained in the same manner as in Example 1 except that as the electrolytic solution, a solution having 1.5 mol/kg of $(C_2H_5)_3(CH_3)N^+BF_4^-$ dissolved in a propylene carbonate solvent, was used.

EXAMPLE 11 (COMPARATIVE EXAMPLE)

A coin-shaped electric double layer capacitor was obtained in the same manner as in Example 1 except that as the electrolytic solution, a solution having 1.5 mol/kg of $(C_2H_5)_3(CH_3)N^+BF_4^-$ dissolved in a propylene carbonate solvent, was used.

EXAMPLE 12 (COMPARATIVE EXAMPLE)

A cylindrical electric double layer capacitor was obtained in the same manner as in Example 3 except that as the electrolytic solution, a solution having 1.2 mol/kg of $(C_2H_5)_4N^+BF_4^-$ dissolved in an acetonitrile solvent, was used.

EXAMPLE 13 (COMPARATIVE EXAMPLE)

A coin-shaped electric double layer capacitor was obtained in the same manner as in Example 4 except that as the electrolytic solution, a solution having 1.5 mol/kg of $(C_2H_5)_3(CH_3)N^+BF_4^-$ dissolved in a solvent mixture comprising sulfolane and ethylmethyl carbonate in a mass ratio of 8:2, was used.

EXAMPLE 14 (COMPARATIVE EXAMPLE)

A coin-shaped electric double layer capacitor was obtained in the same manner as in Example 1 except that as the electrolytic solution, a solution having 1.5 mol/kg of $(C_2H_5)_3(CH_3)N^+BF_4^-$ dissolved in a solvent mixture comprising propylene carbonate and benzene in a mass ratio of 95:5, was used.

EXAMPLE 15 (COMPARATIVE EXAMPLE)

A coin-shaped electric double layer capacitor was obtained in the same manner as in Example 1 except that as the electrolytic solution, a solution having 1.5 mol/kg of $(C_2H_5)_3(CH_3)N^+BF_4^-$ dissolved in a solvent mixture comprising propylene carbonate and monochlorobenzene in a mass ratio of 95:5, was used.

EXAMPLE 16 (COMPARATIVE EXAMPLE)

A coin-shaped electric double layer capacitor having a diameter of 18.4 mm and a thickness of 2.0 mm was obtained in the same manner as in Example 1 except that as the electrolytic solution, a solution having 2.2 mol/kg of the salt of the above formula 5 dissolved in a dimethyl carbonate solvent, was used.

EXAMPLE 17 (COMPARATIVE EXAMPLE)

A coin-shaped electric double layer capacitor having a diameter of 18.4 mm and a thickness of 2.0 mm was obtained in the same manner as in Example 1 except that as the electrolytic solution, a solution having 2.4 mol/kg of the salt of the above formula 6 dissolved in a dimethyl carbonate solvent, was used.

EXAMPLE 18 (COMPARATIVE EXAMPLE)

A coin-shaped electric double layer capacitor having a diameter of 18.4 mm and a thickness of 2.0 mm was obtained in the same manner as in Example 1 except that as the electrolytic solution, a solution having 2.5 mol/kg of the salt of the above formula 7 dissolved in a propylene carbonate solvent, was used.

Evaluation

The compositions of the respective electrolytic solutions in Examples 1 to 9 and Examples 10 to 18, and the voltage retention after the electric double capacitors having the voltage as identified in Tables 1 and 2 applied, were maintained in an open circuit for 72 hours, are shown in Tables 1 and 2, respectively. To make the comparison in performance clear, the applied voltages were adjusted to be the same in Examples 1, 10, 14 and 15, in Examples 2 and 11, in Examples 3 and 12, in Examples 4 and 13, in Examples 5, 6 and 16, in Examples 7, 8 and 17, and in Examples 9 and 18, respectively. Further, the same voltages as for the evaluation of the voltage retention, were applied to the electric double layer capacitors of Examples 1 to 18, whereby the initial capacitance and the internal resistance were measured, and further the change in capacitance after maintaining them in a constant temperature and humidity chamber of 70° C. for 1,000 hours, was measured. The results are shown in Table 3.

TABLE 1

| Components of the electrolytic solution | Compositional ratio (%) | Voltage (V) | Voltage retention (%) |
|---|---|---|---|
| Ex. 1 $(C_2H_5)_3(CH_3)N^+BF_4^-$ | 30.4 | 2.5 | 94 |
| Propylene carbonate | 66.1 | | |
| Monofluorobenzene | 3.5 | | |
| Ex. 2 $(C_2H_5)_3(CH_3)N^+BF_4^-$ | 30.4 | 2.8 | 92 |
| Propylene carbonate | 66.8 | | |
| 1,2-Difluorobenzene | 2.8 | | |
| Ex. 3 $(C_2H_5)_4N^+BF_4^-$ | 26.0 | 2.5 | 91 |
| Acetonitrile | 71.8 | | |
| 1,2,3-Trifluorobenzene | 2.2 | | |
| Ex. 4 $(C_2H_5)_3(CH_3)N^+BF_4^-$ | 30.4 | 3.0 | 92 |
| Sulfolane | 55.7 | | |
| Ethylmethyl carbonate | 10.4 | | |
| Monofluorobenzene | 3.5 | | |
| Ex. 5 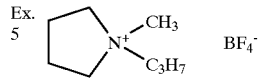 | 47.3 | 3.0 | 91 |
| Dimethyl carbonate | 31.6 | | |
| Monofluorobenzene | 21.1 | | |
| Ex. 6 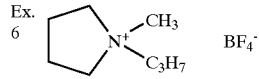 | 47.3 | 3.0 | 93 |
| Dimethyl carbonate | 31.6 | | |
| Ethylmethyl carbonate | 5.3 | | |
| Monofluorobenzene | 15.8 | | |
| Ex. 7 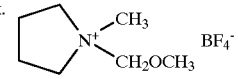 | 52.1 | 3.0 | 90 |
| Dimethyl carbonate | 28.7 | | |
| Monofluorobenzene | 19.2 | | |
| Ex. 8 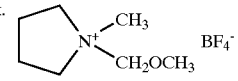 | 52.1 | 3.0 | 91 |
| Dimethyl carbonate | 28.7 | | |
| Ethylmethyl carbonate | 4.8 | | |
| Monofluorobenzene | 14.4 | | |
| Ex. 9 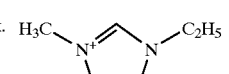 | 49.5 | 2.5 | 93 |
| Propylene carbonate | 40.4 | | |
| Monofluorobenzene | 10.1 | | |

TABLE 2

| Components of the electrolytic solution | Compositional ratio (%) | Voltage (V) | Voltage retention (%) |
|---|---|---|---|
| Ex. 10 $(C_2H_5)_3(CH_3)N^+BF_4^-$ | 30.4 | 2.5 | 89 |
| Propylene carbonate | 69.6 | | |
| Ex. 11 $(C_2H_5)_3(CH_3)N^+BF_4^-$ | 30.4 | 2.8 | 85 |
| Propylene carbonate | 69.6 | | |
| Ex. 12 $(C_2H_5)_4N^+BF_4^-$ | 26.0 | 2.5 | 85 |
| Acetonitrile | 74.0 | | |
| Ex. 13 $(C_2H_5)_3(CH_3)N^+BF_4^-$ | 30.4 | 3.0 | 86 |
| Sulfolane | 55.7 | | |
| Ethylmethyl carbonate | 13.9 | | |
| Ex. 14 $(C_2H_5)_3(CH_3)N^+BF_4^-$ | 30.4 | 2.5 | 90 |
| Propylene carbonate | 66.1 | | |
| Benzene | 3.5 | | |
| Ex. 15 $(C_2H_5)_3(CH_3)N^+BF_4^-$ | 30.4 | 2.5 | 92 |
| Propylene carbonate | 66.1 | | |
| Monochlorobenzene | 3.5 | | |
| Ex. 16 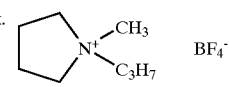 | 47.3 | 3.0 | 87 |
| Dimethyl carbonate | 52.7 | | |
| Ex. 17 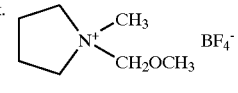 | 52.1 | 3.0 | 87 |
| Monofluorobenzene | 47.9 | | |
| Ex. 18 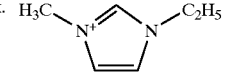 | 49.5 | 2.5 | 90 |
| Propylene carbonate | 50.5 | | |

TABLE 3

| | Applied voltage | Capacitance | Internal resistance | Change in capacitance |
|---|---|---|---|---|
| Ex. 1 | 2.5 V | 2.49 F | 8.6 Ω | −12.4% |
| Ex. 2 | 2.8 V | 2.61 F | 8.8 Ω | −17.9% |
| Ex. 3 | 2.5 V | 4.20 F | 100 m | −15.4% |
| Ex. 4 | 3.0 V | 2.78 F | 15.7 Ω | −14.5% |
| Ex. 5 | 3.0 V | 2.81 F | 8.8 Ω | −13.6% |
| Ex. 6 | 3.0 V | 2.79 F | 9.2 Ω | −14.5% |
| Ex. 7 | 3.0 V | 2.81 F | 8.8 Ω | −15.9% |
| Ex. 8 | 3.0 V | 2.85 F | 8.3 Ω | −15.0% |
| Ex. 9 | 2.5 V | 2.89 F | 7.1 Ω | −12.9% |
| Ex. 10 | 2.5 V | 2.50 F | 8.6 Ω | −16.7% |
| Ex. 11 | 2.8 V | 2.59 F | 9.0 Ω | −21.8% |
| Ex. 12 | 2.5 V | 4.15 F | 100 mΩ | −20.1% |
| Ex. 13 | 3.0 V | 2.79 F | 15.5 Ω | −19.7% |
| Ex. 14 | 2.5 V | 2.49 F | 9.1 Ω | −14.2% |
| Ex. 15 | 2.5 V | 2.48 F | 9.0 Ω | −13.7% |
| Ex. 16 | 3.0 V | 2.81 F | 8.5 Ω | −19.2% |
| Ex. 17 | 3.0 V | 2.81 F | 8.0 Ω | −22.1% |
| Ex. 18 | 2.5 V | 2.84 F | 7.6 Ω | −15.4% |

As is evident from Tables 1 and 2, the electric double layer capacitors of the present invention show higher voltage retention than Comparative Examples employing electrolytic solutions containing no fluorobenzene. Further, as is evident from Table 3, the electric double layer capacitors of the present invention show a less decrease in capacitance when a voltage is applied at 70° C. and thus have excellent reliability.

According to the present invention, it is possible to provide an electric double layer capacitor having high voltage retention and characteristics excellent in reliability.

The entire disclosure of Japanese Patent Application No. 2002-119059 filed on Apr. 22, 2002 including specification, claims and summary is incorporated herein by reference in its entirety.

What is claimed is:

1. An electric double layer capacitor having a pair of polarized electrodes and an electrolytic solution capable of forming an electric double layer at the interface with the polarized electrodes, wherein the electrolytic solution is an organic electrolytic solution containing a fluorobenzene selected from the group consisting of a monofluorobenzene, a difluorobenzene and a trifluorobenzene of the formula 1:

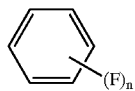

Formula 1 wherein n is an integer of from 1 to 3, and
wherein the fluorobenzene is contained in an amount of from 0.1 to 30% in the total mass of the electrolytic solution.

2. The electric double layer capacitor according to claim 1, wherein the solvent in the electrolytic solution is at least one member selected from the group consisting of propylene carbonate, butylene carbonate, sulfolane, dimethyl carbonate and methylethyl carbonate.

3. The electric double layer capacitor according to claim 1, wherein the electrolyte in the electrolytic solution has a cation of the formula 2:

$R^1R^2R^3R^4N^+$   Formula 2 wherein each of the groups $R^1$, $R^2$, $R^3$ and $R^4$, which are independent of one another, is a methyl group, an ethyl group or a n-propyl group, provided that two groups selected from $R^1$ to $R^4$ may be connected with each other to form a tetramethylene group.

4. The electric double layer capacitor according to claim 1, wherein the electrolyte of the electrolytic solution has a cation of the formula 3:

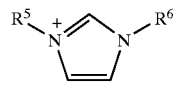

Formula 3 wherein each of the groups $R^5$ and $R^6$ which are independent of each other, is a $C_{1-3}$ alkyl group.

5. The electric double layer capacitor according to claim 1, wherein the electrolyte in the electrolytic solution has a cation of the formula 4:

$R^7R^8R^9R^{10}N^+$   Formula 4 wherein $R^7$ is a methoxyalkyl group of the formula —(CH$_2$)$_n$OCH$_3$, wherein n is an integer of from 1 to 3, and each of the groups $R^8$, $R^9$ and $R^{10}$, which are independent of one another, is a methyl group or an ethyl group, provided that two groups selected from the groups $R^8$ to $R^{10}$ may be connected with each other to form a tetramethylene group.

6. The electric double layer capacitor according to claim 1, wherein the electrolyte in the electrolytic solution has an anion selected from the group consisting of $BF_4^-$, $PF_6^-$, $CF_3SO_3^-$ and $(CF_3SO_2)_2N^-$.

7. The electric double layer capacitor according to claim 6, wherein an electrolyte of the formula 5 or 6:

Formula 5

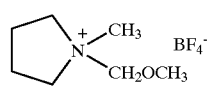

Formula 6 is contained in an amount of from 30 to 60%, monofluorobenzene is contained in an amount of from 0.1 to 30%, and dimethyl carbonate is contained in an amount of from 20 to 69%, in the total mass of the electrolytic solution.

8. The electric double layer capacitor according to claim 7, wherein ethylmethyl carbonate is contained in an amount of from 0.1 to 30% in the total mass of the electrolytic solution.

9. The electric double layer capacitor according to claim 6, wherein an electrolyte of the formula 7:

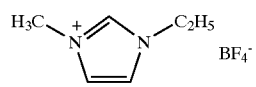

Formula 7 is contained in an amount of from 15 to 60%, monofluorobenzene is contained in an amount of from 0.1 to 30%, and propylene carbonate is contained in an amount of from 10 to 84%, in the total mass of the electrolytic solution.

10. An organic electrolytic solution comprising a fluorobenzene of the formula 1:

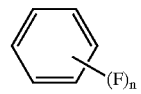

Formula 1 wherein n is an integer of from 1 to 3, and an electrolyte having at least one cation selected from the group consisting of a cation of the formula 2:

R$^1$R$^2$R$^3$R$^4$ N$^+$   Formula 2 wherein each of the groups R$^1$, R$^2$, R$^3$ and R$^4$, which are independent of one another, is a methyl group, an ethyl group or a n-propyl group, provided that two groups selected from the groups R$^1$ to R$^4$ may be connected with each other to form a tetramethylene group, a cation of the formula 3:

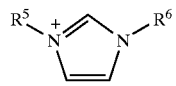
Formula 3 wherein each of the groups R$^5$ and R$^6$ which are independent of each other, is a C$_{1-3}$ alkyl group, and a cation of the formula 4:

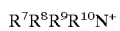
R$^7$R$^8$R$^9$R$^{10}$N$^+$   Formula 4 wherein R$^7$ is a methoxyalkyl group of the formula —(CH$_2$)$_n$ OCH$_3$, wherein n is an integer of from 1 to 3, and each of the groups R$^8$, R$^9$ and R$^{10}$ which are independent of one another, is a methyl group or an ethyl group, provided that two selected from the groups R$^8$ to R$^{10}$ may be connected with each other to form a tetramethylene group.

11. The organic electrolytic solution according to claim 10, wherein the fluorobenzene is contained in an amount of from 0.1 to 30% in the total mass.

12. The organic electrolytic solution according to claim 11, which contains at least one solvent selected from the group consisting of propylene carbonate, butylene carbonate, sulfolane, dimethyl carbonate and methylethyl carbonate.

13. The organic electrolytic solution according to claim 10, which contains at least one solvent selected from the group consisting of propylene carbonate, butylene carbonate, sulfolane, dimethyl carbonate and methylethyl carbonate.

14. The organic electrolytic solution according to claim 10, wherein the anion of the electrolyte is an anion selected from the group consisting of BF$_4^-$, PF$_6^-$, CF$_3$SO$_3^-$ and (CF$_3$SO$_2$)$_2$N$^-$.

15. The organic electrolytic solution according to claim 14, wherein an electrolyte of the formula 5 or 6:

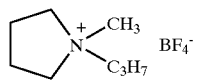
Formula 5

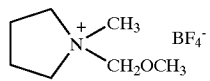
Formula 6 is contained in an amount of from 30 to 60%, monofluorobenzene is contained in an amount of from 0.1 to 30%, and dimethyl carbonate is contained in an amount of from 20 to 69%, in the total mass.

16. The organic electrolytic solution according to claim 15, wherein ethylmethyl carbonate is contained in an amount of from 0.1 to 30% in the total mass.

17. The organic electrolytic solution according to claim 14, wherein an electrolyte of the formula 7:

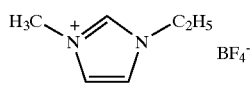
Formula 7 is contained in an amount of from 15 to 60%, monofluorobenzene is contained in an amount of from 0.1 to 30%, and propylene carbonate is contained in an amount of from 10 to 84%, in the total mass.

18. An electric double layer capacitor having a pair of polarized electrodes and an electrolytic solution capable of forming an electric double layer at the interface with the polarized electrodes, wherein the electrolytic solution is an organic electrolytic solution containing a fluorobenzene of the formula 1A:

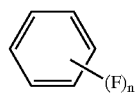
Formula 1A wherein n is an integer of from 1 to 6, in an amount of from 0.1 to 30% in the total mass of the electrolytic solution.

19. An organic electrolytic solution comprising a fluorobenzene of the formula 1:

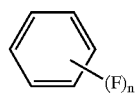
Formula 1A

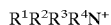

wherein n is an integer of from 1 to 6, and an electrolyte having at least one cation selected from the group consisting of a cation of the formula 2:

R$^1$R$^2$R$^3$R$^4$N$^+$   Formula 2 wherein each of R$^1$, R$^2$, R$^3$ and R$^4$ which are independent of one another, is a methyl group, an ethyl group or a n-propyl group, provided that two selected from R$^1$ to R$^4$ may together form a tetramethylene group, a cation of the formula 3:

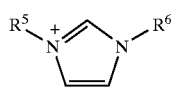
Formula 3 wherein each of R$^5$ and R$^6$, which are independent of each other, is a C$_{1-3}$ alkyl group, and a cation of the formula 4:

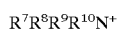
R$^7$R$^8$R$^9$R$^{10}$N$^+$   Formula 4 wherein R$^7$ is a methoxyalkyl group of the formula —(CH$_2$)$_n$ OCH$_3$, wherein n is an integer of from 1 to 3, and each of R$^8$, R$^9$ and R$^{10}$ which are independent of one another, is a methyl group or an ethyl group, provided that two selected from R$^8$ to R$^{10}$ may together form a tetramethylene group, wherein the fluorobenzene is contained in an amount of from 0.1 to 30% in the total mass.

* * * * *